(12) United States Patent
Kravets

(10) Patent No.: US 6,704,727 B1
(45) Date of Patent: Mar. 9, 2004

(54) METHOD AND SYSTEM FOR GENERATING A SET OF SEARCH TERMS

(75) Inventor: Alexander N. Kravets, Marina Del Rey, CA (US)

(73) Assignee: Overture Services, Inc., Pasadena, CA (US)

( * ) Notice: Subject to any disclaimer, the term of this patent is extended or adjusted under 35 U.S.C. 154(b) by 0 days.

(21) Appl. No.: 09/494,818

(22) Filed: Jan. 31, 2000

(51) Int. Cl.⁷ .............................................. G06F 17/30
(52) U.S. Cl. .................. 707/5; 707/3; 707/4; 707/6; 707/10; 707/104; 707/102
(58) Field of Search .......................... 707/3, 4, 5, 104, 707/6, 10, 102; 704/1

(56) References Cited

U.S. PATENT DOCUMENTS

| | | | | |
|---|---|---|---|---|
| 4,290,105 A | | 9/1981 | Cichelli et al. ................. 707/5 |
| 5,206,949 A | * | 4/1993 | Cochran et al. ................ 707/4 |
| 5,396,624 A | * | 3/1995 | Campbell, Jr. ............... 707/100 |
| 5,404,507 A | | 4/1995 | Bohm et al. .................... 707/4 |
| 5,715,444 A | | 2/1998 | Danish et al. .................. 707/4 |
| 5,742,816 A | * | 4/1998 | Barr et al. ................... 707/104 |
| 5,745,894 A | * | 4/1998 | Burrows et al. ................ 707/5 |
| 5,752,051 A | * | 5/1998 | Cohen ........................... 704/1 |
| 5,778,367 A | | 7/1998 | Wesinger, Jr. et al. |
| 5,802,515 A | | 9/1998 | Adar et al. ..................... 707/5 |
| 5,819,259 A | | 10/1998 | Duke-Moran et al. ......... 707/3 |
| 5,862,223 A | | 1/1999 | Walker et al. |
| 5,926,811 A | | 7/1999 | Miller et al. ................... 707/5 |
| 5,995,979 A | * | 11/1999 | Cochran ...................... 707/104 |
| 6,006,225 A | * | 12/1999 | Bowman et al. ............... 707/5 |
| 6,012,053 A | * | 1/2000 | Pan et al. ....................... 707/3 |
| 6,032,145 A | * | 2/2000 | Beall et al. ..................... 707/5 |
| 6,070,158 A | * | 5/2000 | Kirsch et al. ................... 707/3 |
| 6,233,575 B1 | * | 5/2001 | Agrawal et al. ................ 707/6 |
| 6,269,361 B1 | * | 7/2001 | Davis et al. .................... 707/3 |
| 6,285,987 B1 | | 9/2001 | Roth et al. |
| 6,308,176 B1 | * | 10/2001 | Bagshaw ...................... 707/10 |
| 6,405,197 B2 | * | 6/2002 | Gilmour ........................ 707/5 |

OTHER PUBLICATIONS

Shneiderman, "A Framework for Search Interfaces", IEEE, 1997, pp. 18–20.*

Press Release article titled "GoTo.com Announces First round of Financing, Totaling More Than $6 Million, Led by Draper, Fisher Jurvetson", *Business Wire*, dated May 19, 1998, printed from the Internet at <http://www.dialogclassic.com/main.vingw> on Nov. 9, 2000, 2 pages.

Ubois, Jeff, article titled "He who pays the piper . . . ", *MIDRANGE Systems*, vol. 9, No. 12, 1996, p. 50 (1), reprinted by Cardinal Business Media, Inc.

News of The Week articles, *Telephony*, May 1, 1995, pp. 8 and 10.

Nuts 'N Bolts articles, *Target Marketing*, Oct. 1997, 1 page.

DoubleClick TestIt!, obtained at the internet address: http://web.archive.org/web/19980205034316/www.doubleclick.com/nf/adinfo/testiset.htm, dated Oct. 16, 2002, 4 pages.

(List continued on next page.)

*Primary Examiner*—Thuy N. Pardo
(74) *Attorney, Agent, or Firm*—Brinks Hofer Gilson & Lione (57) ABSTRACT

A method and system for providing a set of search terms in response to a user input are disclosed. A first set of search terms is selected from a master set of search terms based upon a match between the input and the search terms or based upon a predefined association between the input and the search terms. A second set of search terms is selected from the first set of search terms in response to a value score that is established for each of the search terms. The value score is selected based at least in part upon the amount of revenue that each search term generates for the system's operator.

19 Claims, 9 Drawing Sheets

OTHER PUBLICATIONS

DoubleClick Frequently Asked Questions, obtained at the internet address: http://web.archive.org/web/19980205033925/www.doubleclick.com/nf/adinfo/facts.htm, dated Oct. 16, 2002, 5 pages.

"New Service Puts Ad Auction, Search Engine Under One Roof", article from Electronic Advertising & Marketplace Report, *Simba Information, Inc*. Apr. 28, 1998, 2 pages.

Google Search, communication from Jeffrey Brewer at Jeffrey@goto.com, titled "Need reverse stemming software", dated May 27, 1998, obtained at the internet address: http://groups.google.com/groups?selm=356CEE4A8DE882A8%40goto.com, on Dec. 19, 2002, 1 page.

Ketchpel, Steven P. et al. "U–PAI: A Universal Payment Application Interface", conference material article from the Second USENIX Workshop on Electronic Commerce Proceedings, Oakland, California, Nov. 18–21, 1996, 17 pages.

Schwatz, Randal L., "Click–Through Tracking in Perl", *Web Techniques*, dated May 1998, located at the internet address: www.webtechniques.com, 3 pages.

Van Roeden, Adriaan, "Your Own Search Engine With SWISH, A Custom Search Facility For Your Web Site", *Web Techniques*, dated Nov. 1996, located at the internet address: www.webtechniques.com, pp. 63–66 pages.

Full Catalog—Categories Menu, Sun Microsystems Sun Solutions Catalog, obtained at the internet address: http://web.archive.org/web/19981205110211/solutions.sun.com/catalogs/all/index.htm, printed on Dec. 19, 2002, 2 pages.

Help on Making Queries—Search by Company or Product, obtained at the internet address: http://web.archive.org/web/19981203050002/solutions.sun.com/search–help.htm, printed on Dec. 19, 2002, 4 pages.

Online Updating, Sun Microsystems Sun Solutions Catalog obtained at the internet address: http://web.archive.org/web/19990220190636/solutions.sun.com/editmodule/help.html, printed on Dec. 19, 2002, 2 pages.

\* cited by examiner

METHOD AND SYSTEM FOR GENERATING A SET OF SEARCH TERMS

FIELD OF THE INVENTION

The present invention relates to a method and system for generating a set of search terms in response to an input provided by a user. More particularly, the present invention relates to a method and system for generating a set of search terms in response to an input provided by a user and a value score that is established for each search term.

Reference to Computer Program Listings Submitted on Compact Disk

A compact disk appendix is included containing computer program code listings pursuant to 37 C.F.R. 1.52(e) and is hereby incorporated by reference. The compact disk contains program code files in ASCII format. The total number of compact disks is 1 and the files included on the compact disk are as follows:

| Creation Date | Creation Time | File Size (Bytes) | File Name |
|---|---|---|---|
| 01/30/2003 | 9:51 am | 468,992 | 9623-164 Appendices A and B.doc |

BACKGROUND

Search engines are commonly used to search the information available on computer networks such as the World Wide Web to enable users to locate information of interest that is stored within the network. To use a search engine, a user typically enters one or more search terms that the search engine uses to generate a listing of information, such as web pages, that the user is then able to access and utilize. The information resulting from the search is commonly identified as a result of an association that is established between the information and one or more of the search terms entered by the user. Different search engines use different techniques to associate information with search terms and to identify related information. These search engines also use different techniques to provide the identified information to the user. Accordingly, the likelihood of information being found as a result of a search varies depending upon the search engine used to perform the search.

This uncertainty is of particular concern to web page operators that make information available on the World Wide Web. In this setting, there are often several web page operators that are competing for the same group of potential views or customers. Accordingly, a web page's ability to be identified as the result of a search is often important to the success of a web page. Therefore, web page operators often seek to increase the likelihood that their web page will be seen as the result of a search.

One type of search engine that provides web page operators with a more predictable method of being seen as the result of a search is a "pay for performance" arrangement where web pages are displayed based at least in part upon a monetary sum that the web page owner has agreed to pay to the search engine operator. The web page operator agrees to pay an amount of money, commonly referred to as the bid amount, in exchange for a particular position in a set of search results that is generated in response to a user's input of a search term. A higher bid amount will result in a more prominent placement in a set of search results. Thus, a web page operator may attempt to place high bids on one or more search terms to increase the likelihood that their web page will be seen as a result of a search for that term. However, there are many similar search terms, and it is difficult for a web page operator to bid on every potentially relevant search term. Likewise, it is unlikely that a bid will be made on every search term. Accordingly, a search engine operator may not receive any revenue from searches performed using certain search terms for which there are no bids.

In addition, because the number of existing web pages is ever increasing, it is becoming more difficult for a user to find relevant search results. The difficulty of obtaining relevant search results is further increased because of the search engine's dependency on the search terms entered by the user. The search results that a user receives are directly dependent upon the search terms that the user enters. The entry of one search term may not result in relevant search results, while the entry of only a slightly different search term can result in relevant search results. Accordingly, the selection of search terms is often an important part of the search process. However, current search engines do not enable a search engine operator to provide specific search terms, such as those that will produce relevant search results, to a user. A system that overcomes these deficiencies is needed.

SUMMARY OF THE INVENTION

In accordance with one embodiment of the invention, a set of search terms is provided to a user in response to an input that is provided by the user. In response to the input, a first set of search terms is generated from a master set of search terms where a portion of each of the search terms in the first set match the input. A second set of search terms is then selected from the first set of search terms based upon a value score that is established for each search term. The value score can be established based, at least in part, upon how much revenue is generated by the search term. The second set of search terms can then be displayed to the user.

According to another embodiment of the invention, in response to input provided by the user, a first set of search terms is generated where the terms are associated with the input, but do not match the input. A second set of search terms is then selected from the first set of search terms based upon a value score that is established for each search term. The value score can be established based, at least in part, upon how much revenue is generated by the search term.

DETAILED DESCRIPTION OF THE PRESENTLY PREFERRED EMBODIMENTS

Figure 1:
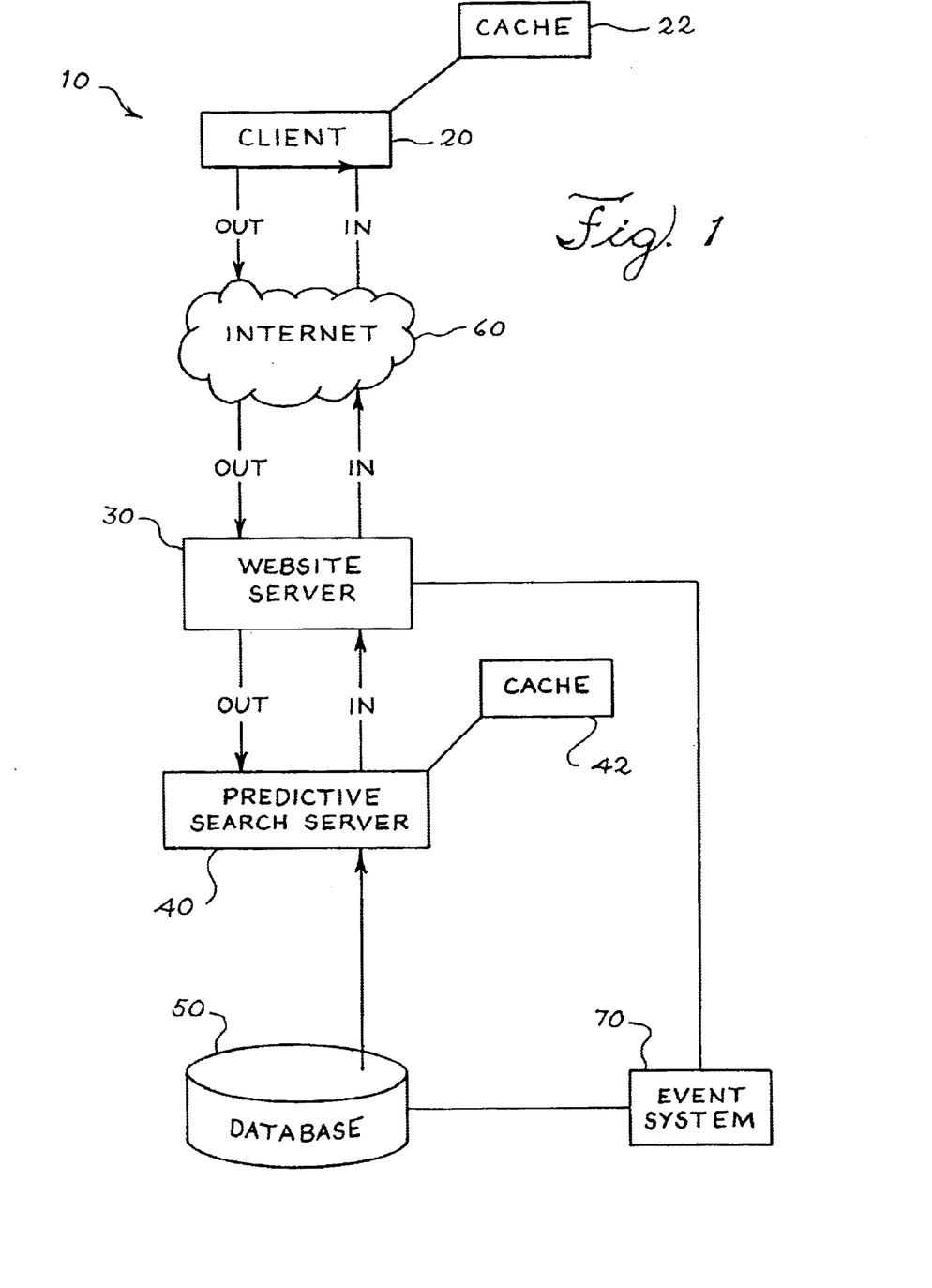
FIG. 1 is a block diagram of a system for providing a set of search terms to a user of a preferred embodiment.

Referring now to FIG. 1, a system 10 for generating a set of search terms in response to an input provided by a user is shown. The system 10 comprises a client 20, a website server 30, a predictive search server 40, a database 50, and an event system monitor 70. The system 10 is preferably configured as a client/server architecture. The client 20 preferably comprises a personal computer but can comprise a workstation or any other suitable computer of any size. The client 20 preferably implements a web browser such as Navigator, Explorer, Netscape, or Mosaic, which enables a user to access a "pay for performance" search engine such as the one operated by GoTo.com at www.gotgo.com or as described in pending U.S. patent application Ser. No. 09/322,677 now U.S. Pat. No. 6,269,361, which is incorporated herein by reference. The system 10 can be used in conjunction with other types of search engines as well.

The client 20 preferably includes a cache memory 22 that can be used in conjunction with a web browser to store information received from the search server 40, as described below. The cache memory 22 is preferably incorporated with the client 20, but can also be external to the client 20. The client 20 is preferably coupled within the website server 30 via a network 60, such as the Internet. Alternatively, the client 20 can be coupled with the website server 30 via other networks such as a local area network (LAN), a wide area network (WAN), or a regional or other form of network. The phrase "coupled with," as used herein, means coupled either directly or indirectly via one or more intervening elements.

The client 20 is preferably operative to communicate with the website server 30 using a communication protocol such as HyperText Transfer Protocol (HTTP) or any other suitable protocol. The client 20 is also preferably operative to request a service that is provided by the website server 30 or the predictive search server 40 without having to know any working details about the website server 30 or the predictive search server 40. The client 20 is preferably operative to support JavaScript, which can also be known as ECMAScript, such as the one depicted in Appendix A, which enables the client 20 to generate requests, store information in the cache 22, and display information to a user. The information is preferably displayed through the use of an Internet web browser in an appropriate HTML sub-document element such as an IFRAME element of the HTML4.0 specification or an ILAYER/LAYER element of the Netscape Navigator.

The website server 30 preferably comprises a computer that is coupled with the client 20, the predictive search server 40, and the event system monitor 70. Alternatively, the website server 30 can comprise a workstation or any other suitable computer of any size or a plurality of computers connected in a network configuration. The website server 30 preferably comprises a Website Dynamo Servlet in a standard Dynamo Application Server but can comprise a plurality of Website Dynamo Application Servers. The website server 30 is preferably operative to implement a search engine such as the one operated by GoTo.com at www.goto.com or as described in pending U.S. patent application Ser. No. 09/322,677 now U.S. Pat. No. 6,269,361. The website server 30 is preferably operative to process requests transmitted from the from client 20 and is preferably operative to forward the requests to the predictive search server 40 via an Internet protocol such as the Unreliable Datagram Protocol (UDP).

The predictive search server 40 preferably comprises a computer that is coupled with the website server 30 and the database 50. Alternatively, the predictive search server 40 can comprise a workstation or any other suitable computer of any size or a plurality of computers connected in a network configuration. The predictive search server 40 preferably includes a cache memory 42 that can be used to store information such as a value score file, as described below. The cache memory 42 is preferably incorporated with the predictive search server 40, but can also be external to the search server 42. The predictive search server 40 is operative to maintain a master set of search terms. As used herein, the phrase "search term" means one or more individual words, numbers, identifiers, terms, or any other form of data. The master set of search terms preferably comprises a set of terms used for use with a search engine for searching the information available on the World Wide Web. The master set of search terms can also comprise other sets of information such as library of congress book numbers, a list of car parts for one or more makes of cars, or a list of the makes and models of cars or boats, for example.

The predictive search server 40 preferably maintains a list of precomputed HTML/JavaScripts that correspond to the search terms in the master set. These scripts can be used to display information to a user as a result of a search. The predictive search server 40 is also operative to receive and store a value score file from the database 50 that lists the value score for each of the search terms within the master set.

The predictive search server 40 is preferably operative to implement a computer program such as the Java program listed in Appendix B attached hereto that enables it to respond to requests from the client 20. The predictive search server 40 is operative to generate UDP protocol responses in response to UDP requests from the client 20. One such UDP request is a search request that can cause the predictive search server 40 to identify one or more sets of search terms from the master set of search terms in response to an input provided by the user, as described herein. A single predictive search server 40 can be used in conjunction with one or a plurality of Website Dynamo Application Servers. A plurality of predictive search servers 40 can also be used.

While the client 20, the website server 30, and the predictive search server 40 are depicted as separate elements, they can be implemented on a single computer. In addition, the functions of the client 20, the website server 30 and the predictive search server 40 can be combined in a single computer or distributed among many computers.

The database 50 preferably comprises a statistics database that is coupled with the predictive search server 40 and the event system monitor 70. The database 50 preferably comprises a Sun Solaris Server and Oracle database software, but any suitable hardware and software can be used. The database 50 is operative to maintain a list of value scores for the master set of search terms. The database 50 is also operative to receive statistical information relating to the search terms in the master set and update the value scores in response to the statistical information. The database 50 can receive the statistical information from the event system monitor 70. The value scores can be automatically updated in real time, near real time, or at given intervals of time, such as daily, weekly, or monthly. The value scores can be transmitted to the predictive search sever 40 in the form of a value score file.

The value score for each search term can be determined in any number of ways. In a preferred embodiment, a value score comprises a number or index that is between 1 and 100 and is calculated as a composite based upon a number of factors. In a preferred embodiment, where the system 10 is used in conjunction with a pay for performance search engine, the index is a composite in which 85% of the composite is the revenue that that term has generated for the search engine operator and 15% of the composite is the number of time the term has been used in a search in a certain time period. The revenue is preferably calculated by multiplying the bidded amount for a search term and the number of times that search term is entered. The time period for the number of searches preferably comprises one month but can comprise any period of time. The value score can also comprise one or more letters or other symbols.

In alternative embodiments, the value score can be calculated using different percentages of the same factors. In addition to the above factors, the value score can be calculated using one or more of the following factors: the frequency at which a search term is used, the clickthrough rate of a search term, the paid clickthrough rate of a search term, a demographic profile, and a psychographic profile. The clickthrough rate preferably represents the frequency at which users select or click on search results for a given search term. The frequency can be determined by dividing the total number of search results for a search term that are selected by a user by the total number of searches for a search term that are requested by all the users. This can be used as a measure of how often a user receives relevant information as the result of a search. The demographic profile preferably represents certain characteristics or features of a user that can be used to alter the search terms that are display to that user. The psychographic profile preferably represents certain preferences or tendencies of a user. For example, the psychographic profile can include the user's sensitivity to price of an item such as a compact disc or the user's preference in music (i.e. rap music versus opera).

The event system monitor 70 is preferably coupled with the website server 30 and the database 50. The event system monitor 70 monitors the events occurring on the website server 30 to determine various parameters such as the total number of searches requested by all users of the site, the number of times each search term is entered by a user, the number of times a user selects one of the search results presented to them, the amount of revenue generated by a search term in a pay for performance type search engine, or other suitable parameters. The event system monitor collects the data required to determine various parameters and is able to generate reports detailing the different parameters that can be sent to the database 50.

Figure 2:
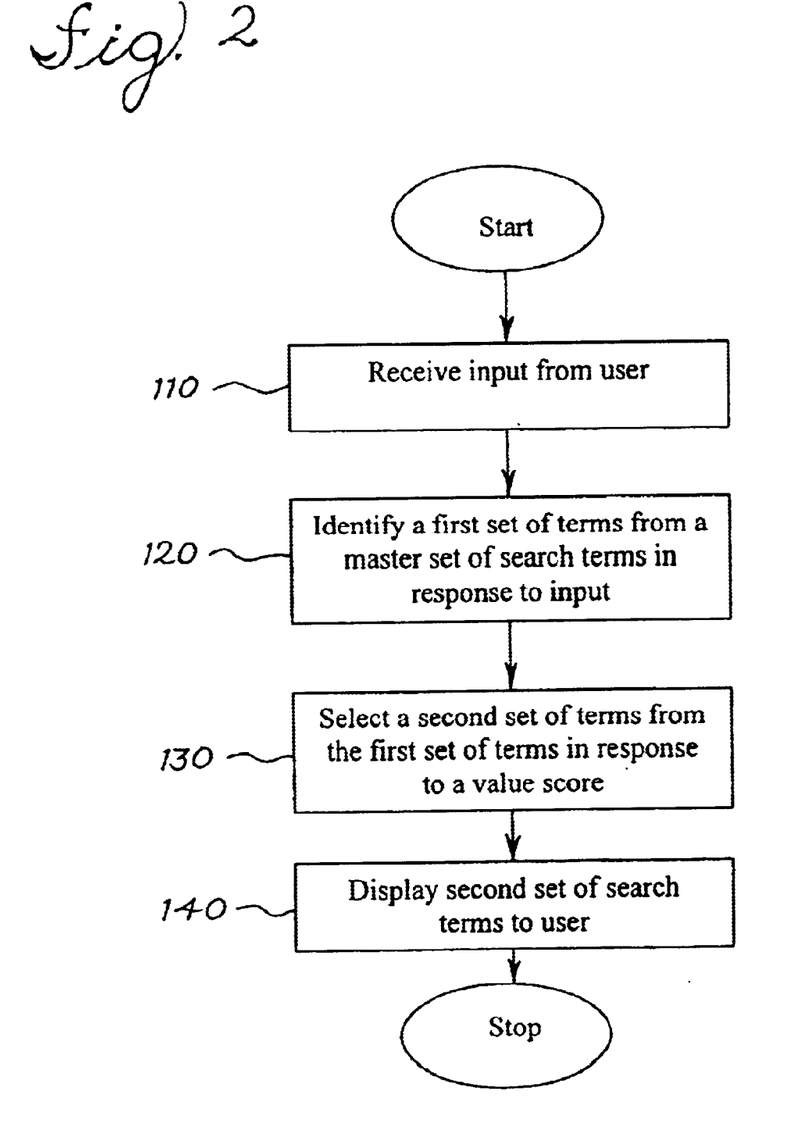
FIG. 2 flow chart of a method for providing a set of search terms to a user of a preferred embodiment.

The system depicted in FIG. 1 can be used to implement the method depicted in FIG. 2. Assume for purposes of this example that a user is utilizing a web browser operating on the client 20 to search information available in a network such as the World Wide Web, for example. Also assume that the user is utilizing a pay for performance search engine such as the one that is provided by GoTo.com at www.goto.com, which requires the user to provide an input to initiate the search. Upon receipt of an input from a user (act 110), a first set of search terms is identified from a master set of search terms in response to the input (act 120). The input received from the user preferably comprises three alphanumeric characters entered by the user using a keyboard at the client 20, but can consist of any number of characters as well as any other suitable input such as voice input or other input as discussed herein. A second set of search terms is then selected from the first set of search terms in response to a value score for each search terms in the first set (act 130). The second set of search terms can then be displayed to the user (act 140).

Figure 3:
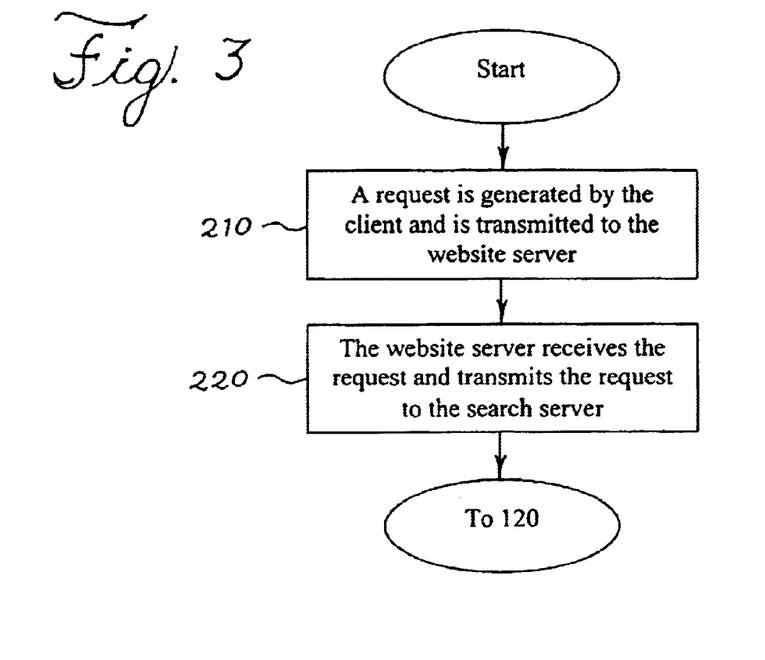
FIG. 3 is a more detailed flow chart of a portion of the method depicted in FIG. 2.

Referring now to FIG. 3, the act of receiving an input from a user (act 120, FIG. 2) preferably comprises the following acts. When a user at the client 20 provides an input, a request is automatically generated by the client 20 and is transmitted to the website server 30 (act 210, FIG. 3). The request includes the input provided by the user and requests a response from the predictive search server 40. Upon receipt of the request, the website server 30 forwards the request to the predictive search server 40 (act 220).

Figure 4:
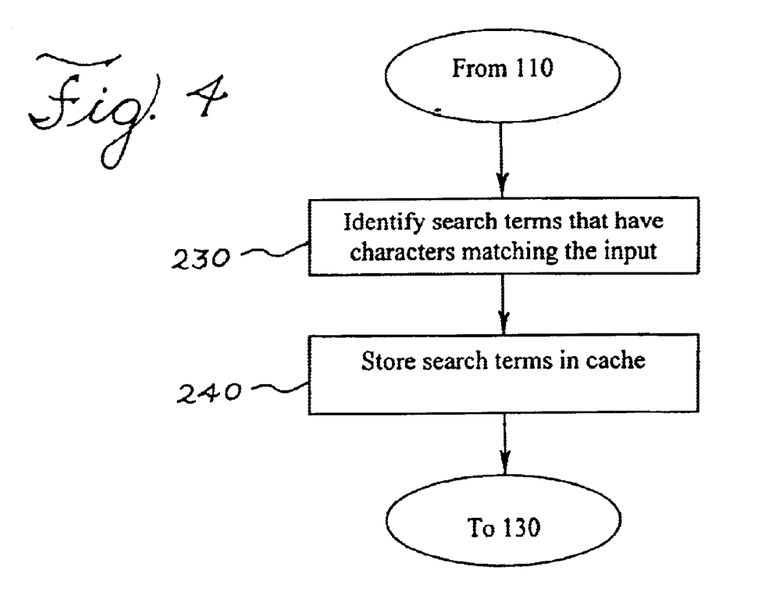
FIG. 4 is a more detailed flow chart of a portion of the method depicted in FIG. 2.

Referring now to FIG. 4, the act of identifying a first set of search terms from a master set of search terms in response to the input provided by the user (act 120, FIG. 2) preferably comprises the following acts. After receiving the request from the website sever 30, the predictive search server 40 identifies a first set of search terms where the first three characters of each search term match the three character input provided by the user (act 230, FIG. 4). The first set of search terms preferably comprises 500 search terms but can comprise any number of search terms. The first set of search terms can then be stored in the cache memory 42 that is coupled with the predictive search server 40 (act 240). In alternative embodiments, the predictive search server 40 can respond to various inputs as described herein and can identify a first set of search terms by identifying search terms that have, for example, less than or greater than three matching characters.

In an alternative embodiment, after the first set of search terms has been selected by the search server 40 (act 230, FIG. 4) the first set of search terms can be transmitted to the client 20 and can be stored in the cache memory 22. The precomputed HTML/JavaScript for each search term can also be transmitted from the predictive search server 40 to the client 20. This process is commonly referred to as aggressive read ahead caching and limits the amount of information that must be transferred form the predictive search server 40 to the client 20 during subsequent stages of the present method. The first set of search terms can then be accessed by either the client 20 or the predictive search server 40 to determine a second set of search terms as described herein.

In an alternative embodiment, the act of identifying a first set of search terms from a master set of search terms in response to the input provided by the user (act 120, FIG. 2), can comprise the following acts. After receiving the request from the website sever 30, the predictive search server 40 identifies a first set of search terms where the first three characters of each search term do not match the three character input provided by the user, but where the search terms are associated with the input provided by the user. The predictive search server 40 preferably identifies this first set of search terms through a reverse indexing process the associates search terms with possible inputs that a user can provide. This allows for the identification of search terms that would likely be of interest to a user but that do not share the same characters as the search terms.

For example, if a user provided the input "ope" presumably seeking information about an opera, the search term "New York Opera" could be provided. In other examples, the input of a portion of a recording artist's name could result in the display of songs performed by the artist; the input of a portion of an author's name could result in the display of books by that author; the input of a portion of the name of a state could result in the display of cities located within that state; the input of a portion of a class name could result in the display of students in that class; the input of a portion of a school name could result in the display of teachers in that school; the input of a portion of a symptom of an illness could result in the display of drugs associated with that symptom; the input of a portion of a type of animal could result in the display of animals in that classification; and the input of a portion of the name of an article of manufacture, the name of the manufacturer, or the serial number of the article could result in the display of manufacturers of that type of item. Other relationships are also possible.

In a further alternative embodiment, the act of identifying a first set of search terms from a master set of search terms in response to the input provided by the user (act 120, FIG. 2), can comprise the following acts. The predictive search server 40 can identify a first set of search terms where one or more of the search terms is identified through either a match between the first three characters of the search term and the input provided by the user and one or more of the search terms is identified through a reverse indexing process.

Figure 5:
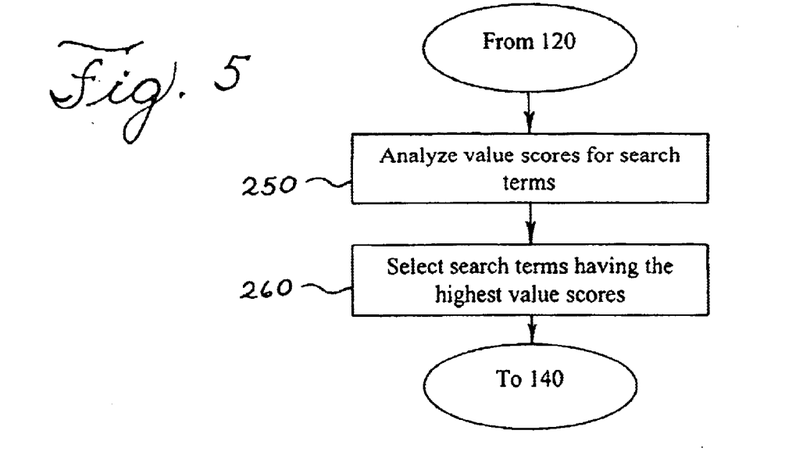
FIG. 5 is a more detailed flow chart of a portion of the method depicted in FIG. 2.

Referring now to FIG. 5, the act of selecting a second set of search terms from the first set of search terms in response to a value score for each search term (act 130, FIG. 2) preferably comprises the following acts. The predictive search server 40 analyzes the value scores that correspond to the search terms collected in the first set (act 250). The can be done through the use of the term value file that can be generated by the database 50 and transmitted to the predictive search server 40, as described herein. The predictive search server 40 can then select a number of search terms, such as six, from the first set of search terms that have the highest value scores (act 260). In alternative embodiments, greater than or less than six search terms can be selected. As described herein, the value score can be determined in various ways.

In an alternative embodiment, the act of displaying the second set of search terms to the client 20 (act 140, FIG. 2) preferably comprises transmitting a precomputed HTML/JavaScript for each term in second set of search terms from the predictive search server 40 to the client 20. In some embodiments this step is not necessary as the precomputed HTML/JavaScript for each of the terms in the first set of search terms is stored at client 20 through the aggressive read ahead caching procedure. The second set of search terms can be displayed to the user is nearly real time while the user is providing the input but before the user finishes providing the input. For example, the second set of search terms can be displayed to the user before the user finishes typing all of the characters of a search term.

Figure 6:
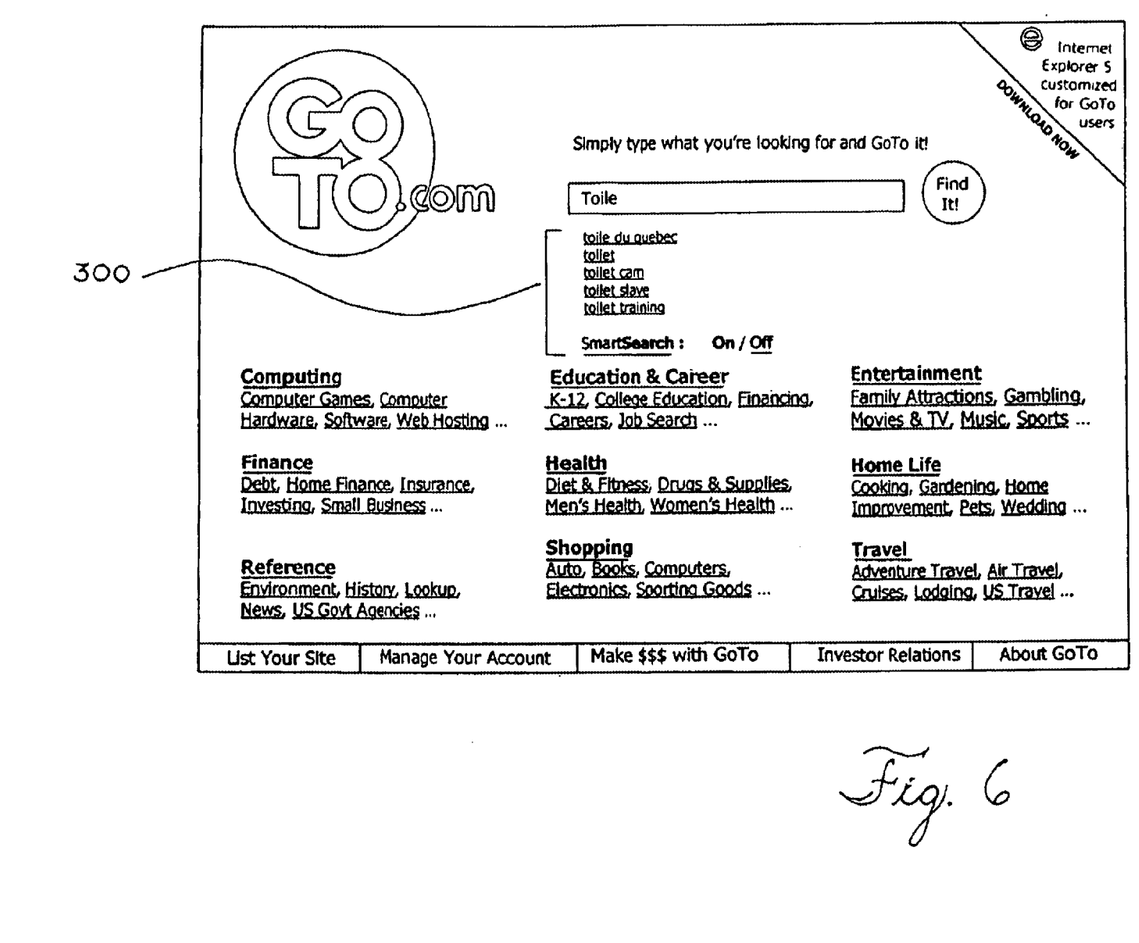
FIG. 6 depicts an arrangement for displaying a set of search terms of a first preferred embodiment.
Figure 7:
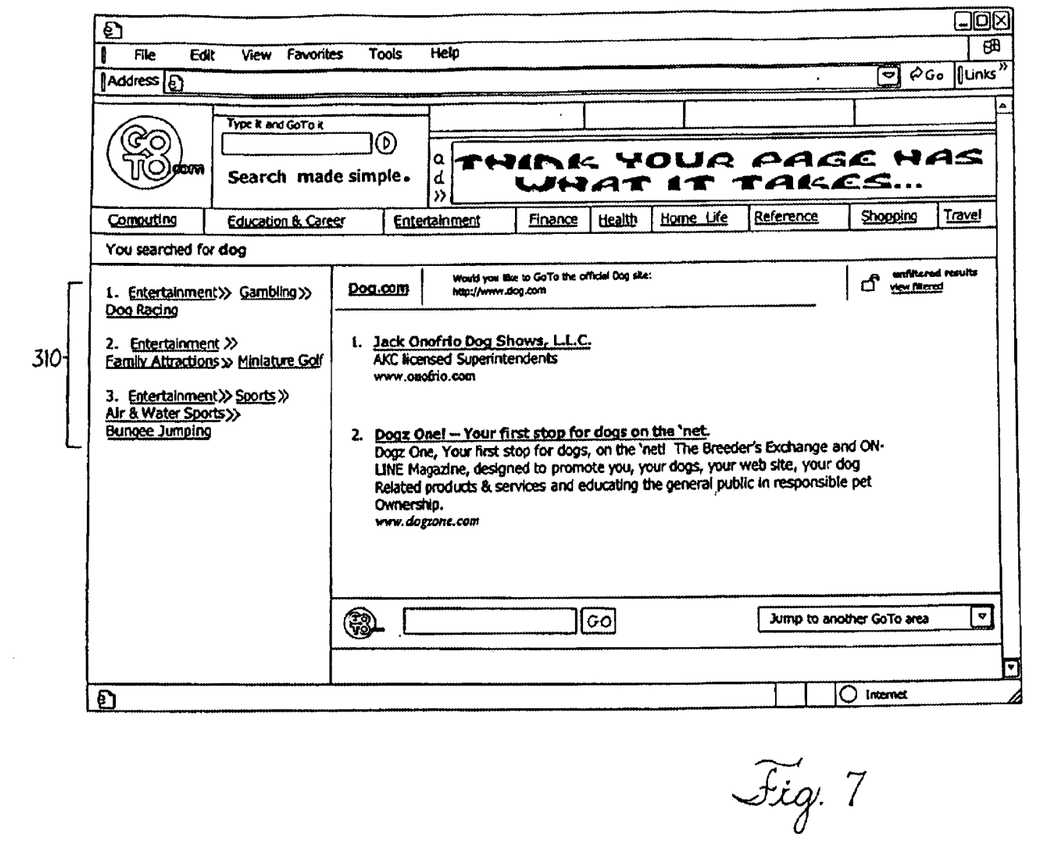
FIG. 7 depicts an arrangement for displaying a set of search terms of a second preferred embodiment.
Figure 8:
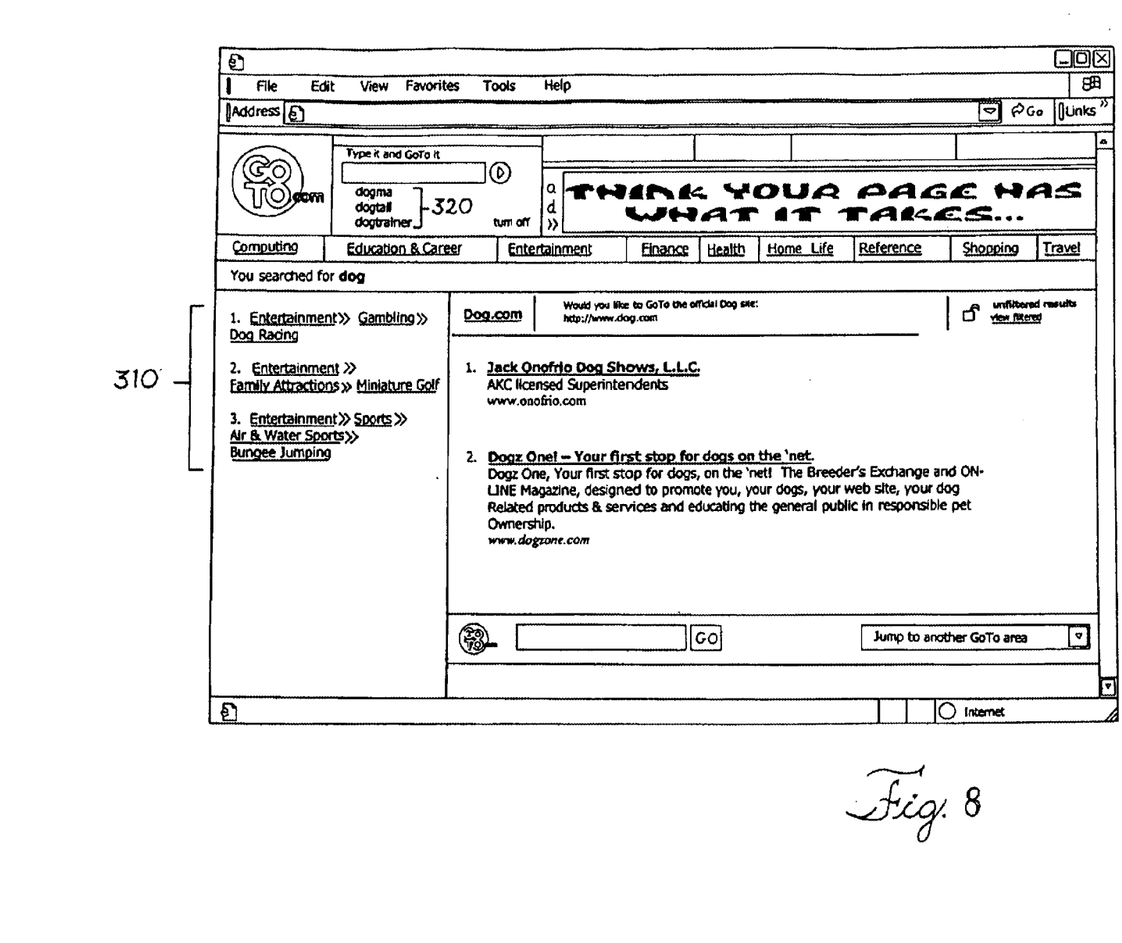
FIG. 8 depicts an arrangement for displaying a set of search terms of a third preferred embodiment.

Referring now to FIGS. 6–8, the second set of search terms can be displayed to the user as shown. The second set of search terms can be displayed as a list 300 in conjunction with a search engine input screen as shown in FIG. 6. The second set of search terms can also be displayed in a single list 310 in conjunction with a search engine results page as shown in FIG. 7. Alternatively, the second set of search terms can be displayed in a first list 310 and a second list 320 in conjunction with a search engine results page a shown in FIG. 8. The second set of search terms can also be displayed in other variations and combinations.

The second set of search terms are preferably displayed in alphabetical order but can be displayed in descending order based on the value score for each search term, ascending order of the value scores, other orders based upon the value score, or in virtually any other order irrespective of the value score. The search terms preferably appear as links as shown in FIG. 6 that, when selected by the user, will result in the automatic display of the search results associated with the search term. Alternatively, the second set of search terms can be displayed as a list of terms that when selected by the user appear in the search query box of a search engine. Alternatively, the second set of search terms can be displayed as a drop-down list that can include links to search results.

Figure 9:
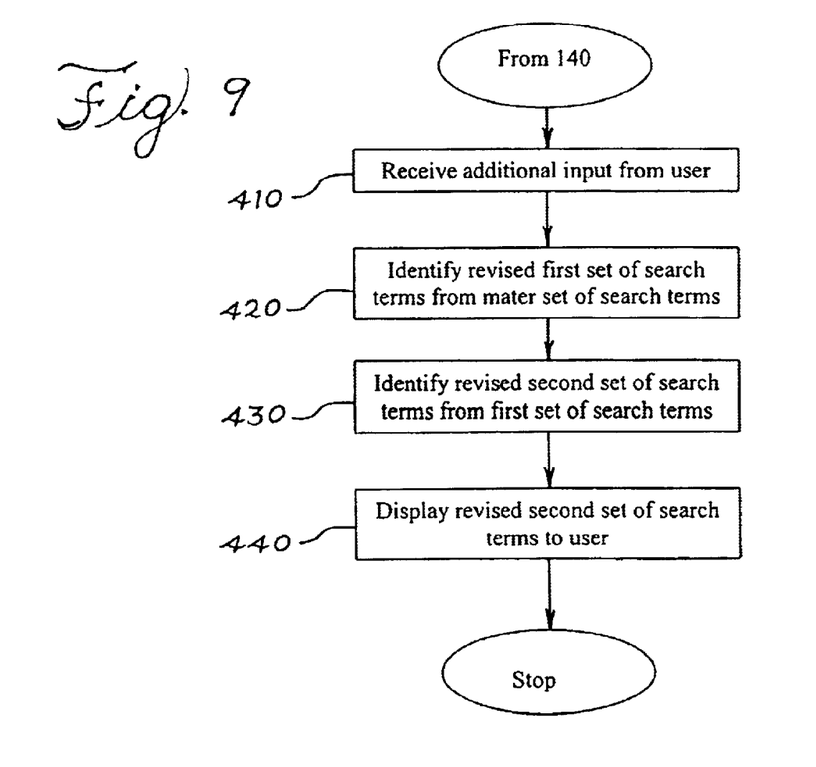
FIG. 9 is a flow chart of a method for providing a set of search terms to a user of a preferred embodiment.

The method of FIG. 2 can be repeated if the user provides additional input. For example, if the user provides a further input such as a fourth character, a revised set of search terms can be identified from the first set of search terms, as described herein, and can be displayed to the user, as described herein. Alternatively, in response to the receipt of additional input provided by a user (act 410, FIG. 9), a revised first set of search terms can be identified from the master set of search terms (act 420), as described herein. A revised second set of search terms can then be identified from the revised first set of search terms (act 430), as described herein and can be displayed to the user (act 440), as described herein.

Figure 10:
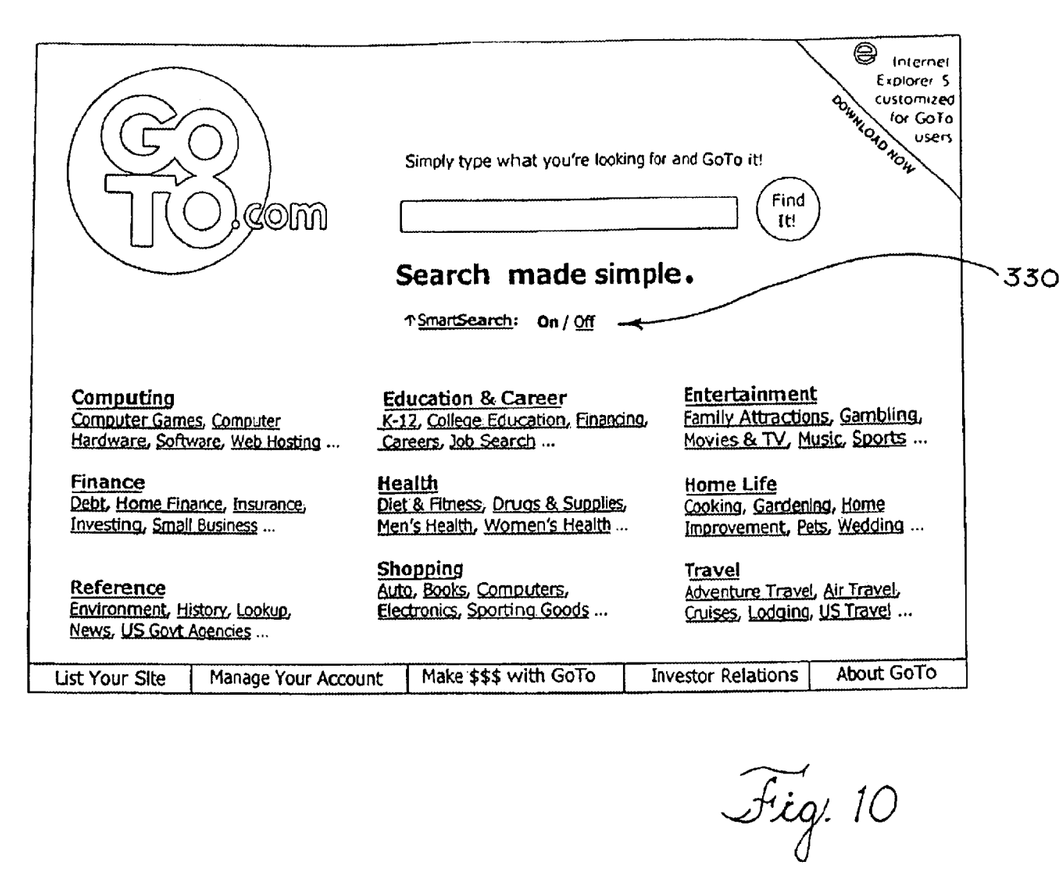
FIG. 10 depicts an arrangement for activating a system for providing a set of search terms of a preferred embodiment.
Figure 11:
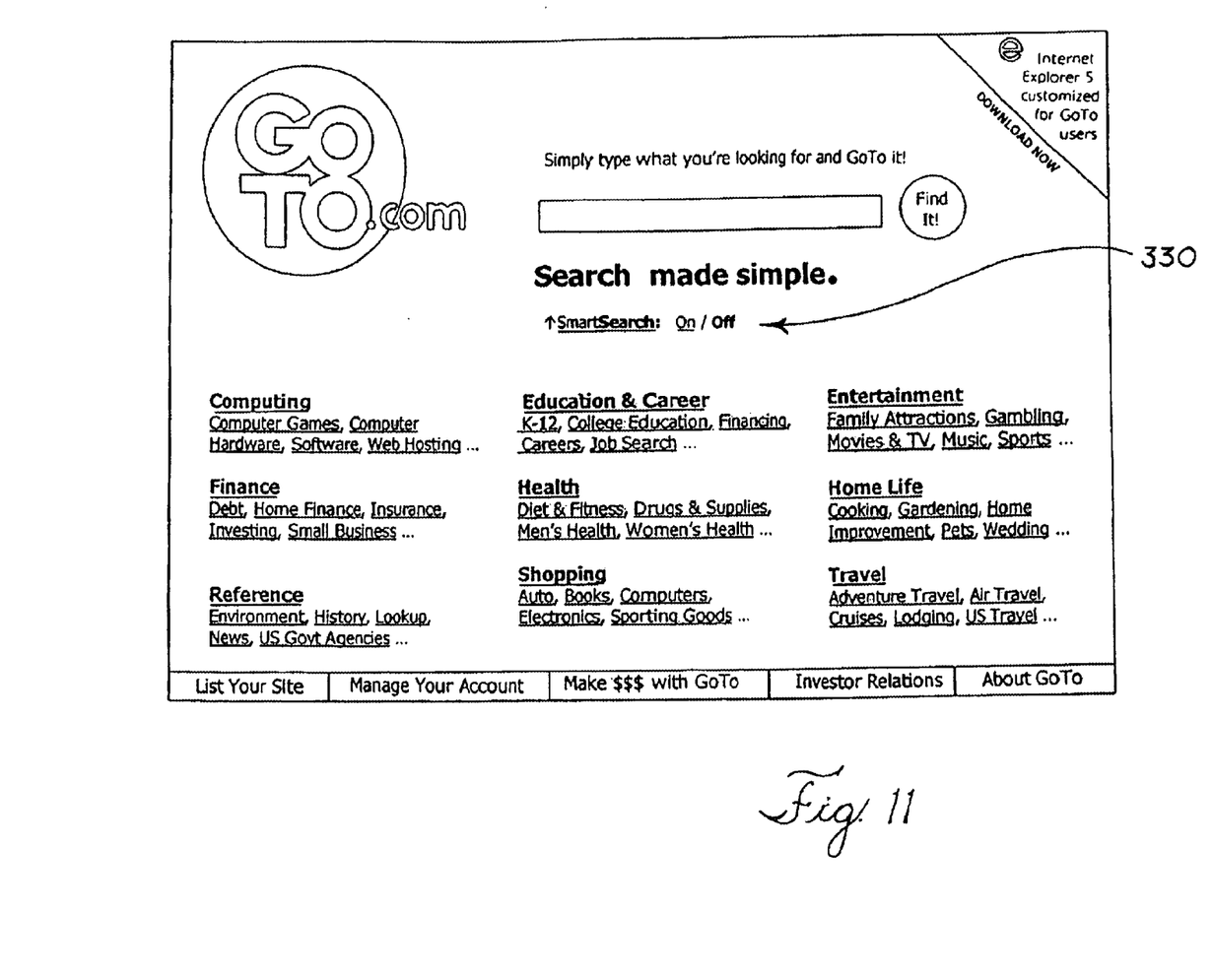
FIG. 11 depicts an arrangement for deactivating a system for providing a set of search terms of a preferred embodiment.

Referring now to FIGS. 10 and 11, the method and system described herein can be used in conjunction with a search engine such as the one provided by GoTo.com at www.goto.com and can be activated and deactivated by a user through the selection or deselection of one or more links 330 as shown in FIGS. 10 and 11. The links 330 can be displayed in conjunction with a traditional search engine entry and can be selected by a user by "clicking" on one of the links 330 to turn the system on or off.

The foregoing method and system enable a set of search terms to be provided to a user in a predictive or suggestive fashion. When the user provides a partial input, the method and system can present the user with a set of search terms that match the partial input or that are somehow related to the partial input. The set of search terms can be displayed to the user is nearly real time while the user is providing the input and before user finishes providing the input. The user can then select from the search terms predicted or suggested to them without having to provide the remainder of his intended input. This enables a search engine operator to provide a user with search terms that are likely to produce the best search results as well as the search terms that will generate the most revenue for the search engine operator.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

I claim:

1. A method of generating a search term list in response to an input from a user, the method comprising:
   (a) providing a server coupled with a database;
   (b) maintaining a master set of search terms in the database;
   (c) determining a value score for each search term in the master set, wherein the value score for each term is determined in response to a number of times that the search term is used during a period of time and by an amount of revenue generated by each search term;

(d) receiving an input from the user via the server;

(e) selecting a first set of search terms from the master set of search terms in response to the input received from the user; and (f) selecting a second set of search terms from the first set of search terms in response to the value score associated with first set of search terms.

2. The method of claim 1, further comprising arranging the second set of search terms in a search term list.

3. The method of claim 1, further comprising displaying the second set of search terms.

4. The method of claim 1, further comprising:

(g) arranging the second set of search terms in a search term list;

(h) displaying the search term list with the terms arranged in descending order based upon the value score for each search term.

5. The method of claim 1, wherein the value score for each search term is determined by a frequency at which the search term is used.

6. The method of claim 1, wherein the value score for each search term is further determined by a number of times that the search term is used during a period of time.

7. The method of claim 1, wherein the input from the user comprises a plurality of characters.

8. The method of claim 1, wherein (b) comprises receiving statistical information for at least one of the search terms in the master set and determining the value score for the at least one search term in response to the statistical information.

9. The method of claim 1, wherein (d) comprises selecting search terms that contain or match the input.

10. The method of claim 1, wherein (d) comprises selecting search terms that are associated with the input.

11. The method of claim 1, wherein (e) comprises selecting search terms that have the highest value score.

12. A system for generating a search term list in response to an input from a user, the system comprising:

a database storing a master set of search terms and a value score for each search term, wherein the value score for each search term is determined in response to a number of times that the search term is used during a period of time and by an amount of revenue generated by each search term;

a server coupled with the database, the serving being operative to select a first set of search terms from the master set of search terms in response to an input received from the user and being operative to select a second set of search terms from the first set of search terms in response to the value score associated with the first set of search terms.

13. The system of claim 12, further comprising a client coupled with the server.

14. The system of claim 12, further comprising an event system monitor coupled with the server and the database.

15. The system of claim 12, wherein the server comprises a plurality of servers.

16. A method of generating a search term list in response to an input from a user, the method comprising:

(a) providing a server coupled with a database;

(b) maintaining a master set of search terms in the database;

(c) determining a value score for each search term in the master set wherein the value score is determined by an amount of revenue generated by each search term and a number of times that the search term is used during a period of time;

(d) receiving an input from the user via the server;

(e) selecting a first set of search terms from the master set of search terms in response to the input received from the user wherein a portion of each term in the first set of search terms matches the input; and (f) selecting a second set of search terms from the first set of search terms in response to the value score associated with first set of search terms.

17. The method of claim 16, further comprising displaying the second set of search terms.

18. A method of generating a search term list in response to an input from a user, the method comprising:

(a) providing a server coupled with a database;

(b) maintaining a master set of search terms in the database;

(c) determining a value score for each search term in the master set wherein the value score is determined by an amount of revenue generated by each search term and a number of times that the search term is used during a period of time;

(d) receiving an input from the user via the server;

(e) selecting a first set of search terms from the master set of search terms in response to the input received from the user wherein each term in the first set of search terms is associated with the input; and (f) selecting a second set of search terms from the first set of search terms in response to the value score associated with first set of search terms.

19. The method of claim 18, further comprising displaying the second set of search terms.

* * * * *